United States Patent [19]

Sawabe et al.

[11] 4,453,102
[45] Jun. 5, 1984

[54] COMMUTATOR FOR FLAT MOTOR

[75] Inventors: Mitsuo Sawabe, Narita; Kouichi Imai, Kawasaki, both of Japan

[73] Assignees: Nihon Radiator Co., Ltd.; Toho Tekko Co., Ltd., both of Tokyo, Japan

[21] Appl. No.: 368,501

[22] Filed: Apr. 14, 1982

[30] Foreign Application Priority Data

Apr. 14, 1981 [JP] Japan ................................. 56-55134

[51] Int. Cl.$^3$ ............................................ H02K 13/04
[52] U.S. Cl. .................................... 310/237; 310/43; 310/235
[58] Field of Search ................................ 310/233–237, 310/219, 232, 42, 43, 268; 29/597

[56] References Cited

U.S. PATENT DOCUMENTS

| 1,757,393 | 5/1930 | Schmid | 310/235 |
| 3,519,863 | 7/1970 | Ambler | 310/234 |
| 3,524,251 | 8/1970 | Burr | 310/268 |
| 3,705,997 | 12/1972 | Bauerle | 310/237 |
| 3,812,576 | 5/1974 | Yamaguchi | 310/237 |
| 3,861,027 | 1/1975 | Allen | 310/237 |

FOREIGN PATENT DOCUMENTS

| 2400269 | 4/1979 | France | 310/233 |
| 56-159959 | 12/1981 | Japan | 310/237 |
| 2013415 | 8/1979 | United Kingdom | 310/233 |
| 396773 | 3/1971 | U.S.S.R. | 310/237 |

Primary Examiner—R. Skudy
Attorney, Agent, or Firm—Gordon W. Hueschen

[57] ABSTRACT

Commutator for a flat motor which includes fan-shaped brush contact pieces and connection pieces upraised from said brush contact pieces and kept electrically integral therewith wherein a plurality of segments made of superior conductive material are arranged in an annular form in a specified spaced apart relation in such a way as said connection pieces are positioned at an inner edge, said segments are insulated with each other by an insulator material, top ends of said connection pieces are bent to an inverted-U shape, their leading ends are buried in said insulator material, connection wires of an armature winding are pushed into the slits made at the top ends of said connection pieces so as to connect the segments with the armature winding.

9 Claims, 10 Drawing Figures

U.S. Patent  Jun. 5, 1984  4,453,102
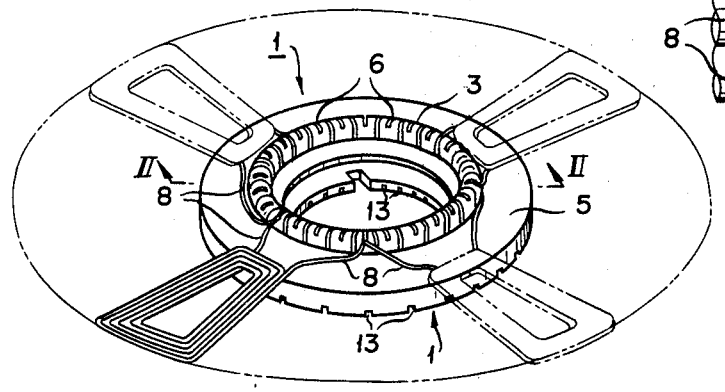
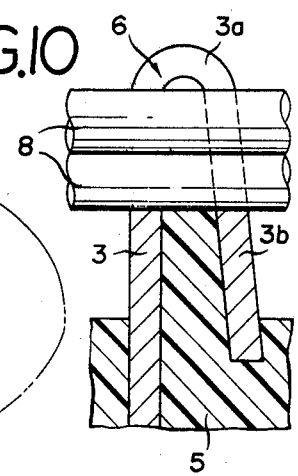
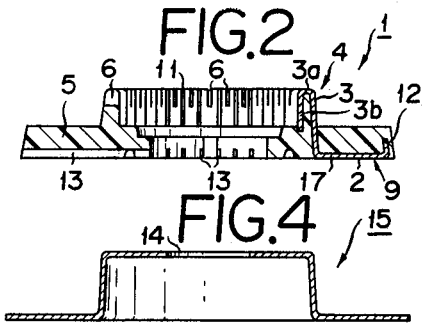
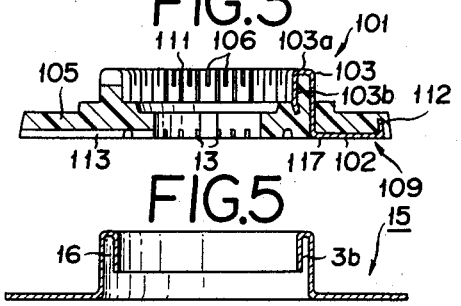
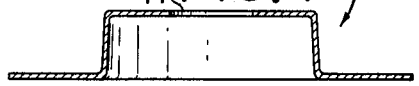
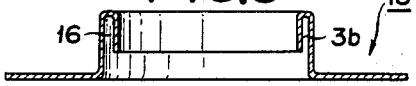
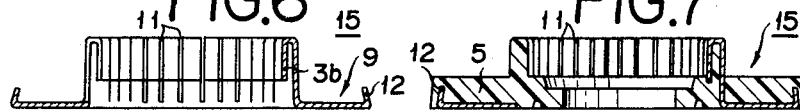
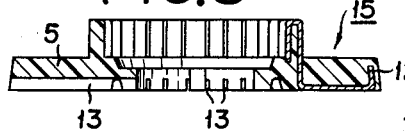
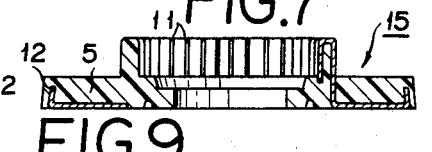
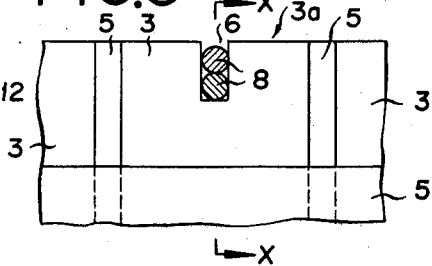

COMMUTATOR FOR FLAT MOTOR

BACKGROUND OF THE INVENTION

1. Field of the Invention

This invention relates to a commutator for a flat motor and its manufacturing process, and more particularly to such a commutator for a flat motor as having a disk-shaped winding armature for facilitating a connection to the armature winding and enabling a production of higher output, and its manufacturing process.

2. Description of Prior Arts

In recent years, there has been proposed a commutator for a flat motor which includes fan-shaped brush contact pieces and connection pieces upraised from said brush contact pieces and kept electrically integral therewith wherein a plurality of segments made of superior conductive material are arranged in an annular form, said segments are insulated with each other by an insulator material, connection wires of an armature winding are pushed into the holes made at the top ends of said connection pieces so as to connect the segments with the armature winding. (U.S. Pat. No. 3,524,251).

However, this type of flat commutator shows not only a difficulty in its manufacturing, but also a restriction in an area occupied by the armature to be formed at the outside of the tab due to the fact that the tab is formed at an outer edge end of the brush contact piece. In particular, when the armature is fixed to a rotary axis of the fan of a direct drive type, a requirement for making a large effective area of the fan causes some limitations over an outer diameter of the flat motor. Due to this fact, it is necessary to approach a position of the tab to a rotary axis as close as possible and make a wide distance between an outer diameter of the armature and the tab in order to make a large area of the armature. Since an output of the motor is proportional to an area of armature, said distance should be increased.

Thus, it is an object of the present invention to provide a novel commutator for a flat motor and its manufacturing process.

It is another object of the present invention to provide a commutator for a flat motor which may cause the motor to produce a higher output power.

It is still further object of the present invention to provide a simple manufacturing process for a commutator for a flat motor.

SUMMARY OF THE INVENTION

These objects described above are accomplished by a provision of a commutator for a flat motor which includes fan-shaped brush contact pieces and connection pieces upraised from said brush contact pieces and kept electrically integral therewith wherein a plurality of segments made of superior conductive material are arranged in an annular form in a specified spaced apart relation in such a way as said connection pieces are positioned at an inner edge, said segments are insulated with each other by an insulator material, top ends of said connection pieces are bent to an inverted-U shape their leading ends are buried in said insulator material, connection wires of an armature winding are pushed into the slits made at the top ends of said connection pieces so as to connect the segments with the armature winding.

BRIEF DESCRIPTION OF THE DRAWINGS

FIG. 1 is a perspective view for schematically illustrating an armature for a flat motor constructed in accordance with the present invention.

FIG. 2 is a sectional view taken along the line II—II of FIG. 1.

FIG. 3 is a sectional view similar to that of FIG. 2 for illustrating another preferred embodiment of the present invention.

FIGS. 4 to 8 are a sectional view for illustrating each of the manufacturing steps of the armature constructed in accordance with the present invention.

FIG. 9 is an enlarged view for showing a substantial part of FIG. 3 with its connected condition.

FIG. 10 is a sectional view taken along the line X—X of FIG. 9.

PREFERRED EMBODIMENT OF THE INVENTION

As shown in FIGS. 1 and 2, segments 4 which constitute a commutator 1 are provided with a fan-shaped brush contact piece 2 and a connector piece 3 upraised from the brush contact piece 2 and electrically integral therewith, the segment being formed of a superior conductive material such as copper and copper alloy etc. The segments 4 are constructed such that a top end 3a of the connector piece 3 is bent to form an inverted U shape, a width of said connector piece being kept constant. A plurality of segments 4 are arranged in an annular form in a specified spaced apart relation in such a way as the connector piece 3 is positioned at their inner edges. A plurality of segments 4 arranged in an annular form are molded by the resin insulator material 5 in an annular form and insulatively fixed thereto. Outer edge end of said segment 4 is formed with a bent part 12 for use in preventing a slip-off of the insulator material 5 when the material is molded. Said inverted-U shaped bent edge 3b is buried in the insulator material 5. In the top end 3a of the inverted-U shaped bent portion, said insulator material 5 is usually charged in integral with the molded part. And it is possible to fix a reinforcement member (not shown) of copper or copper alloy to this bent portion. In said U-shaped bent top end 3a are cut some slits 6. In FIG. 2, a left half section corresponds to the slits 11, 13.

FIG. 3 illustrates another preferred embodiment of the present invention in which a bent end 103b buried in the insulator material 5 is further bent thereinto. In FIG. 3, a reference numeral added by 100 corresponds to the same component element as that shown in FIG. 2.

When such segments as described above are manufactured, at first, a sheet of good conductive material, for example, a copper plate having a silver of 0.03 wt % is pressed to form a hat-like member 15 having a hole 14 at its central part and a flange part 9 at its lower portion, as shown in FIG. 4. Then, as illustrated in FIG. 5, the central hole 14 is drawn inwardly to form a bent part 3b, thereby an annular projection having its top end 3a showing an inverted U-shape is formed. A width of the space 16 at the bent portion is substantially the same as, for example, that of the copper plate. Into the space 16 formed by the bent part 3b is, as required, press fitted an annular reinforcement member of another type of annular reinforcement member coated with a conductive adhesive agent. In this condition, some slits 11 are cut, as shown in FIG. 6, down to the flange 9 in a specified spaced apart relation, then an odd number of connector pieces 3 are formed. Portions corresponding to the slits 13 at the circumference of the flange 9 to be described later are partially cut off and then the remained non-cut portions are bent upwardly. Thus, said comb-like hat shaped member 15 forms a continuous body which is connected only with the flange. In this case, an annular reinforcement member if used, also is cut by the slits 11 so that the reinforcement member is divided in correspondence with to the connector pieces 3. Further, as shown in FIG. 7, the hat-shaped member 15 having said slits 11 is molded to show an annular shape by the synthetic resin insulator 5, for example, FUDOWLITE F5760F (ammonia free phenolic resin with glass powder made by Fudow Chemical Co., Ltd.) with a bottom surface of the flange 9 being exposed. Insulator resin is charged in said slits 11 and each of the connector pieces 3 is insulated with each other. Then, as shown in FIG. 8, a plurality of slits 13 are cut in a radial form in the flange 9 in correspondence to said slits 11 and also in deeper than a thickness of said flange 9, thereby a plurality of fan-shaped divided contact pieces 2 are formed with being separated to each other. Surfaces of the contact pieces 2 become a brush sliding contact surface 17. Then, as shown in FIGS. 1 and 2, slits 6 for a wire connection are cut at the top end 3a in the bent part of the connector piece 3 so as to form a commutator 1.

In the commutator 1 thus formed, as shown in FIGS. 9 and 10, the connecting wires 8 of a winding constituting the armature 7 are pushed into the slits 6, and then they are connected with each other by a so-called hot-stake process.

This hot-stake process is operated such that the connection wires (enamel coated wires) 8 and the commutator 1 are heated by a hot tip heated up to a desired temperature, the connection wires 8 are pushed into the slits 6 by the hot tip, and at the same time the wires are further heated by their energization, finally a thermal press fitting is performed. This hot-stake process enables a breakage of insulation by applying a thermal energy, and also enables both electrical and mechanical connections even if the insulation of the connected wires (enamel coated wires) is peeled off.

As described above, in accordance with the present invention, a top end of the connector piece is bent to form an inverted-U shape and buried into the insulator material, so that a strength of the commutator may be improved and it becomes possible to tie the connection wires to the commutator by applying so-called hot-stake process, and a fast and rigid connection between the commutator and the armature winding may be performed.

The connector piece shows a specified width irrespective of a fan-shape form of the segment, so that a strength of the commutator may substantially be improved.

In accordance with the method of the present invention, each of the segments is not assembled after its manufacturing, but an integrally formed hat-shaped member is bent, some slits are cut in the member so as to form the connection pieces, then the insulator material is molded therein, the flange is cut to make the segments. In view of this fact, its manufacturing may be performed in a quite simple manner.

In the commutator of the present invention, the connector pieces (tab pieces) are formed at the points nearest to a rotary axis, so it is possible to keep a wide distance from an outer edge of said armature to the connector piece even if an outer diameter of the armature is the same as that of a conventional one and therefore an area of the armature may be increased.

What is claimed is:

1. Commutator for a flat motor which includes fan-shaped brush contact pieces and connection pieces upraised from said brush contact pieces and kept electrically integral therewith wherein a plurality of segments made of conductive material are arranged in an annular form in a specified spaced apart relation in such a way as said connection pieces are positioned at an inner edge, said segments are insulated with each other by an insulator material, top ends of said connection pieces are bent to an inverted-U shape, their leading ends are buried in said insulator material, connection wires of an armature winding are pushed into slits made at the top ends of said connection pieces so as to connect the segments with the armature winding.

2. Commutator as set forth in claim 1 in which a width of the connection piece is kept constant.

3. Commutator as set forth in claim 1 in which an outer edge of the segment is formed with a part which projects upwardly into said insulator material to form an anti-slip off thereof.

4. Commutator as set forth in claim 1 in which said insulator material integrally extends into the space in the connection pieces formed by their inverted-U shape.

5. A commutator for a flat motor comprising:
   a hat-shaped member made of conductive material having a tubular central part and a flange part at a lower portion thereof, the top end part of said tubular part projecting inwardly and downwardly so as to form a tubular projection of of inverted U-shape;
   slits in a specified spaced apart relation in said tubular projection from its top end down to a surface of the flange, the number of said slits being such as to provide an odd number of connection pieces separated by the slits;
   a molded insulating resin material in which said material overlies said flange and extends up into said inverted U-shaped projection, both the bottom surface of the flange and upper portion of said tubular projection being exposed and the downwardly projecting end of said tubular projection being buried in said material;
   the flange part of the molded composite having radial slots in a specified spaced apart relation and complementary with said slits, which divide the conductive portion thereof into a plurality of discrete fan-shaped commutator segments each of which is electrically connected with a connection piece; and the top ends of said connection pieces having formed therein wire connection slits.

6. A commutator for a flat motor comprising a hat-shaped member of non-conducting material having an annular flange member and an upstanding tubular member unitary with said annular flange and projecting normally thereto;
   flat, fan-shaped segments of conductive material on the surface of said annular member opposite said tubular member and forming a flat, annular surface in which each segment is electrically-separated from each other segment to form a plurality of commutator segments;
   a connector piece of conductive material extending from the inner end of each said segment through said annular flange, and then cross-wise and down in an inverted U-shape; each said connector piece having a slit therein extending through the bight of the U-shape into said non-conducting material for receiving connecting wires from an armature winding.

7. A commutator of claim 6, in which the ends of said connector pieces extend down into and are anchored in said annular flange.

8. A commutator of claim 6, in which the outer end of each of said flat, fan-shaped segments has a portion imbedded in said non-conducting material.

9. A commutator according to claim 6, in which the space between said flat segments is free of said non-conducting material.

* * * * *

UNITED STATES PATENT AND TRADEMARK OFFICE
CERTIFICATE OF CORRECTION

PATENT NO.   : 4,453,102
DATED        : June 5, 1984
INVENTOR(S)  : Mitsuo Sawabe and Kouichi Imai It is certified that error appears in the above-identified patent and that said Letters Patent is hereby corrected as shown below:

Col. 3, line 18; "slits" should read -- slots --

Signed and Sealed this

Twelfth Day of November 1985

[SEAL]

Attest:

DONALD J. QUIGG

Attesting Officer

Commissioner of Patents and Trademarks